Nov. 23, 1937. W. R. SEIGLE 2,099,756
AIR DUCT
Filed Oct. 29, 1935 2 Sheets-Sheet 1
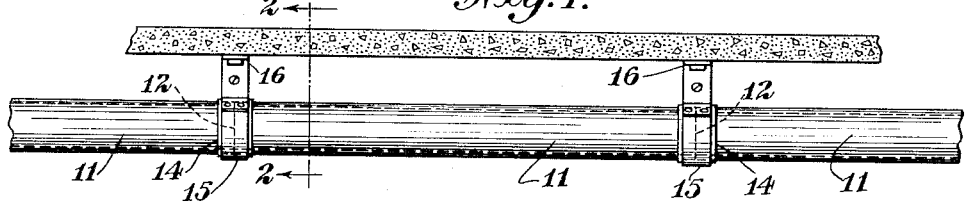
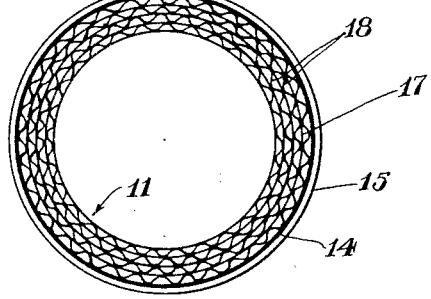
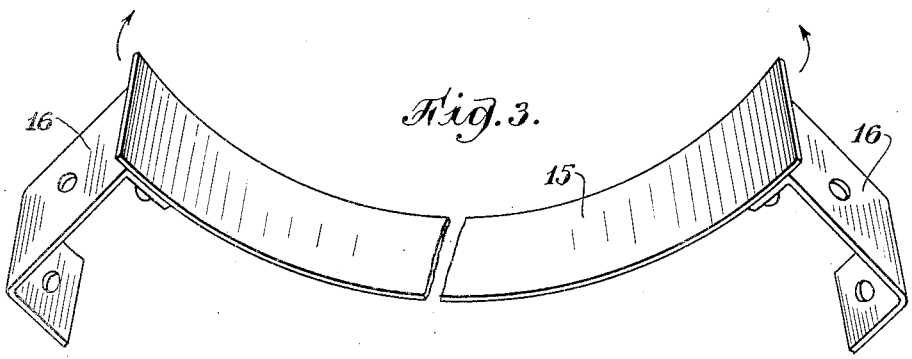
INVENTOR.
William R. Seigle.
BY D. N. Halstead.
ATTORNEY.

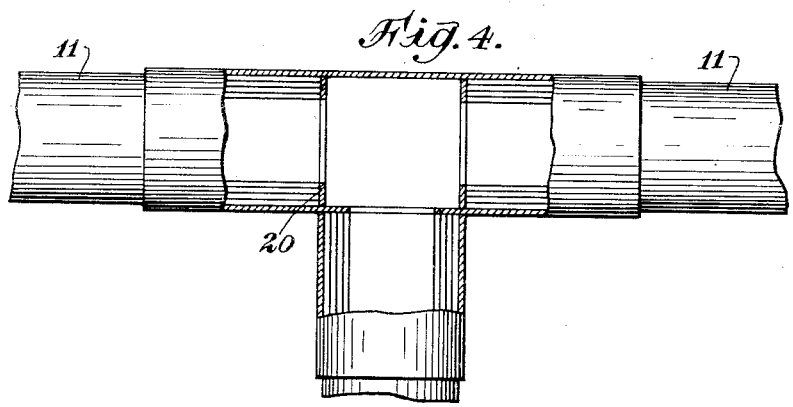
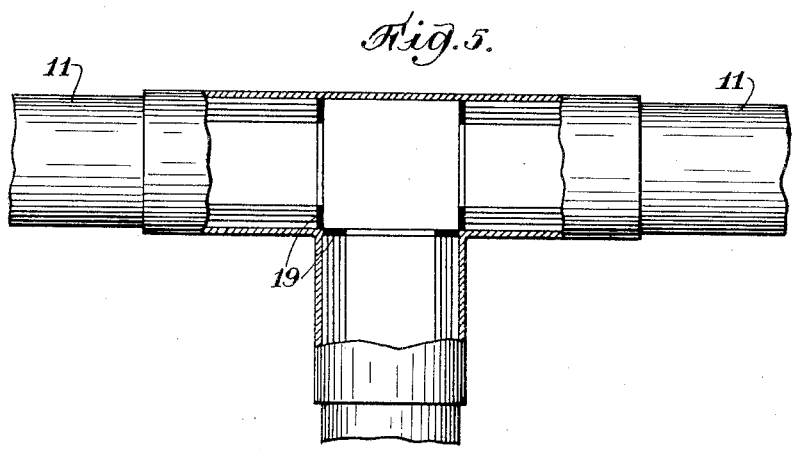
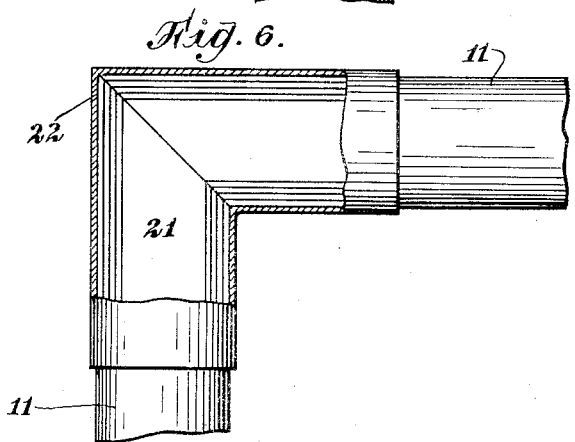

Patented Nov. 23, 1937

2,099,756

UNITED STATES PATENT OFFICE 2,099,756

AIR DUCT

William R. Seigle, Mamaroneck, N. Y., assignor to Johns-Manville Corporation, New York, N. Y., a corporation of New York Application October 29, 1935, Serial No. 47,217

5 Claims. (Cl. 138—78)

This invention relates to a duct for moisture-containing air and to a unit for use therein.

There is extensive use of ducts conveying moisture-containing air, as, for example, so-called conditioned air that is used in buildings.

For conveying such air it is desirable that the duct should be fire-resistant, moisture-resistant, light in weight, adapted to permit the passage of an air stream with a minimum of friction against the interior of the duct, and of thermal insulating effectiveness adequate to minimize change of temperature from that established during the conditioning of the air.

It is an object of the present invention to provide an air duct meeting one or more of these requirements. Other objects and advantages will appear from the detailed description that follows.

In a preferred embodiment, the invention comprises a duct of tubular or other shape, having a wall including a plurality of plies of felted fire-resistant fibres, means securing these plies one to another, and a moisture-proof friction-reducing agent coated over the inner surface of the said wall.

The invention will be described in connection with the attached drawings, in which Fig. 1 shows a side elevation of a representative portion of an air duct constructed in accordance with the invention;

Fig. 2 shows a cross sectional view on line 2—2 of Fig. 1;

Fig. 3 shows in perspective a part of the supporting means in open condition, before being installed in the air duct assembly; and Figs. 4-6 show plan views partly in section of air duct assemblies having turns therein.

There are shown sections 11 of the air duct abutting, end to end, to form a joint 12, means surrounding and closing the joint and means including the member 16 securing the air duct to a supporting superstructure.

The joint closing means comprise suitably a strip 14 extending around the joint and being secured on each side thereof, that is, to the end portion of each of the abutting sections. Thus, the strip may be of a rubbery or elastic nature and preferably adhesive on one or both of its faces, to promote being properly secured in position. A suitable strip for this purpose is a rubberized fabric, of which electrical tape is a satisfactory variety.

For further strengthening of the joint a stirrup or band 15 of metal or the like may be secured around the joint, preferably surrounding and being adhered to the outside of the strip 14.

The wall of the air duct includes fire-resistant fibres felted into a material such as the sheets 17. The sheets may be constituted largely of fibres of milled chrysotile, amosite, or other suitable variety of asbestos. Thus the wall may be constituted largely of a plurality of concentric plies of asbestos paper, this paper being, suitably, a commercial product including a small proportion of binder and a limited proportion of wood pulp.

The several sheets in the wall are composited and secured one to another, as by means such as an inorganic fireproof adhesive.

For best results there is used a moisture-proof friction-reducing agent (not shown). This agent may be disposed as a continuous thin coating over the interior or inner surface of the wall of the air duct and adapted to prevent frictional contact between the sheet material and the air in the duct.

For instance, I have used to advantage a coating of a water-insoluble, moisture-proof, and water-repellent agent adapted, when applied over the interior of the wall, as a lacquer or solution in a volatile solvent, to leave a film of satisfactory smoothness and low coefficient of friction with the air passing thereover. The resulting condition is to be distinguished from that which would prevail if the asbestos paper, for instance, with necessarily somewhat fuzzy surface, were exposed directly to the air stream. Furthermore, the agent of the kind described prevents wetting of the wall of the tube by moisture in the air that is being conveyed.

The several plies of felted fibrous material may each be similarly treated. Thus, I have used a tubular air duct including a fireproof adhesive adhering the several plies together, and the friction-reducing agent protecting the said adhesive, throughout the entire thickness of the wall, from being injured by moisture that might otherwise come in contact therewith. In this manner there is obtained the moisture-proofness, due to the said agent, and fireproofness due to the said adhesive.

In order to obtain the desired thermal insulating property and overall low density of the wall of the air duct, there are provided advantageous means for spacing apart the adjacent sheets in the wall and preventing continuous contact between the said sheets. Means that may be used for this purpose are irregularities of surface 18, the wall including, for instance, composited corrugated and plane-surfaced sheets of asbestos paper.

In making the improved air duct or unit for use therein, there is first made a section of the duct material in conventional manner. Thus, there may be formed a section of tubular pipe covering that is common in the art of thermal insulation and that includes composited spirally wound sheets (concentric plies) of asbestos paper, the corrugated and plane paper being alternated with each other, and a sheet of plane surface preferably forming the interior portion or inner liner of the tube.

A silicate adhesive may be used in making the section of tubular material described.

This adhesive is preferably applied to certain areas on one of the sheets that, in the composite, are in contact with a surface of one of the other sheets. For instance, adhesive may be applied over the tops of the corrugations of a given sheet before being pressed against a sheet of plane surface.

I have used to advantage a fireproof adhesive that is not unfavorably affected by subsequent treatment of the composited section, as, for instance, a substantially water-resistant silicate of a polyvalent metal that is not subject to undesired change upon treatment with alcohol or the solvent in which the friction-reducing agent may be applied. In a typical preparation, the adhesive as applied is a fluent composition including the products of intermixing an aqueous solution of sodium silicate and zinc oxide, in approximately chemically equivalent proportions or with the zinc oxide in slight excess over the sodium silicate. Another composition that may be used is one containing calcium silicate. In making the latter composition, for instance, there may be used asbestos paper including a small proportion of pre-incorporated lime, to which paper an aqueous solution of sodium silicate is added, as over the tops of the corrugations. There results reaction between the sodium silicate and the lime in the paper to give a desirable calcium silicate bond when the plurality of sheets of asbestos paper are composited.

The tubular product so made is dried, if any large proportion of moisture is present. The section is then given a coating of the selected moisture-proof friction-reducing agent, as by being immersed endwise in a solution of the agent.

In a preferred embodiment of the invention, the friction-reducing agent may be a resinous phenol-aldehyde condensation product, a vinyl resin, a highly chlorinated rubber product or the like. The agent may be applied, to the section of air duct, in solution in a volatile solvent for the said agent. Thus, the phenol-aldehyde condensation product may be applied in alcoholic solution. The agent so applied is then hardened, as by evaporation of the volatile solvent used and/or baking.

For some purposes, the coating of the said agent may be applied only to the interior surface of the product.

The sections so prepared are then arranged end to end in proper alinement and supported temporarily. The joint closing means 14, if used, is applied around the joint and the means securing the air duct to the superstructure (this term includes any firm support, such as a permanent wall or ceiling) are secured in suitable manner to the superstructure and to the duct, so that the position of the duct with respect to the remainder of the structure is established.

When the stirrup 15 encircles a joint, there is strengthening at the joint and an increase in the positiveness of the alinement between adjacent sections.

A feature of my air duct is the fact that it is substantially non-resonant in distinction, for instance, from metal ducts that are adapted to resound or transmit the roar or rumble from the fan delivering the conditioned air. The substantially non-resonant or substantially non-vibratory sheets constituting the wall of the duct, particularly when the sheets in the interior of the wall are soft and yielding, damp vibrations and minimize the passage of sound either transversely or longitudinally through the walls of the duct.

The sections of the air duct have voids extending lengthwise thereinto, as, for example, the voids defined between alternating sheets of paper of corrugated and plane surface, respectively. These voids insure the thermal insulating effectiveness of the wall structure.

At the same time, the voids introduce a problem in preventing entrance in the voids of the air being conveyed by the duct. For this reason, the entrances to the voids may be sealed, as by means 19 extending over the end edge of the wall of the section of duct material. The means 19 may consist of a strip of coated fabric, such as electrical tape, adhered in position, putty or cementitious material applied originally in plastic condition and allowed to harden, or other air-impermeable material.

When two or more sections of the duct material meet at an angle, that is, do not extend substantially parallel, there may be used to seal the voids one of the means illustrated in Figs. 4 and 5. These means may constitute flashing.

In Fig. 4 there is shown a member 20 of angular cross section and suitably of formed metal, one leg of which angular section extends over the end edge of the wall of one of the sections and the other leg of which extends likewise over the end edge of the section meeting the first-mentioned section at an angle thereto. As illustrated, this angle may be approximately a right angle.

The other means is illustrated in Fig. 6, in which the sections abut edge to edge as illustrated, for example, at position 21, so that the edge of one section closes the voids at the edge of the abutting section.

In order to keep the abutting sections in the desired relationship to each other, there may be used the rigid collar 22, shown in Fig. 6, or the encircling means 15, also preferably rigid, that has been previously discussed and that is illustrated in Figs. 1 and 3.

It will be understood that the details given are for the purpose of illustration, not restriction, and that variations within the spirit of the invention are intended to be included in the scope of the appended claims.

What I claim is:

1. A duct for moisture-containing air comprising fire-resistant fibres felted into a substantially non-resonant sheet material constituting the major part of the wall of the duct and a moisture-proof friction-reducing agent coated over the inner surface of the wall and preventing frictional contact between the said material and the air in the duct.

2. A tubular duct for moisture-containing air comprising a plurality of plies of asbestos paper in the wall of the said tube, means securing the several plies one to another, to give a unitary wall, and a moisture-proof friction-reducing agent coated over the inner surface of the wall and preventing frictional contact between the asbestos paper and the air in the duct, the said wall including spacing means preventing continuous contact between adjacent plies of the paper and causing the wall to be void-containing, light in weight, and effective as a thermal insulator.

3. A tubular duct for moisture-containing air comprising a plurality of plies of asbestos paper in the wall of the said tube, means securing the several plies one to another, to give a unitary wall, and a moisture-proof friction-reducing agent coated over the inner surface of the wall and preventing frictional contact between the asbestos paper and the air in the duct, the said wall including alternating corrugated and plane sheets of asbestos paper and the means securing the plies one to another being fire-resistant.

4. An air duct comprising tubular sections meeting at an angle, to form a joint therebetween, and having thermal insulating walls provided with voids extending lengthwise into the sections and an air-impermeable member of angular cross section flashing the said joint, one leg of the said member extending across the end edge of one of the tubular sections and another leg of the said member extending across the end edge of the other of the sections and the said member minimizing entrance into the said voids of air being conveyed in the duct.

5. A duct for moisture-containing air comprising a plurality of sections including each composited spaced sheets of asbestos paper constituting the major part of the wall of the duct, a waterproofing agent associated with the paper of the inner surface of the duct and minimizing the entrance of moisture thereinto, and means at the ends of the said sections for preventing the free circulation of air between the spaced sheets in adjacent ones of the said sections.

WILLIAM R. SEIGLE.